United States Patent
Wood (10) Patent No.: US 6,668,440 B1
(45) Date of Patent: Dec. 30, 2003

(54) CONTROL SYSTEM FOR ADJACENT PITCH IN PRESS CURED POSITIVE DRIVE BELTS

(75) Inventor: Douglas Bruce Wood, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/334,637

(22) Filed: Dec. 31, 2002

(51) Int. Cl.$^7$ ................................................ B23Q 17/00
(52) U.S. Cl. ................................ 29/407.05; 29/407.09; 156/137; 156/138
(58) Field of Search ............................ 29/407.05, 407.09, 29/897.2, 407.1; 156/137, 139, 140, 138

(56) References Cited

U.S. PATENT DOCUMENTS

| | | | | |
|---|---|---|---|---|
| 2,600,775 A | * | 6/1952 | Hurry et al. | 264/231 |
| 3,078,206 A | * | 2/1963 | Skura | 156/140 |
| 3,647,342 A | * | 3/1972 | Hunt | 425/330 |
| 3,772,117 A | * | 11/1973 | Vossen | 156/140 |
| 3,860,684 A | * | 1/1975 | Vance, Sr. | 264/157 |
| 4,018,641 A | * | 4/1977 | Donaldson | 156/137 |
| 4,359,355 A | * | 11/1982 | Stecklein et al. | 156/138 |
| 4,395,298 A | * | 7/1983 | Wetzel et al. | 156/137 |
| 4,532,098 A | * | 7/1985 | Campbell et al. | 264/320 |
| 4,586,973 A | * | 5/1986 | Marsh et al. | 156/140 |
| 4,589,941 A | * | 5/1986 | Tanaka et al. | 156/140 |
| 4,617,075 A | * | 10/1986 | Wetzel et al. | 156/137 |
| 4,681,558 A | * | 7/1987 | Rausch | 474/205 |
| 4,884,998 A | * | 12/1989 | Miranti, Jr. | 474/205 |
| 4,938,736 A | * | 7/1990 | Miranti, Jr. | 474/205 |
| 4,976,662 A | * | 12/1990 | Miranti, Jr. | 474/205 |
| 5,209,705 A | * | 5/1993 | Gregg | 474/204 |
| 5,346,439 A | * | 9/1994 | Lynch | 474/205 |
| 5,536,464 A | * | 7/1996 | Muramatsu | 264/254 |
| 5,733,399 A | * | 3/1998 | Wood | 156/138 |
| 5,746,674 A | * | 5/1998 | Tajima et al. | 474/253 |
| 5,961,760 A | * | 10/1999 | Tajima et al. | 156/139 |
| 6,177,042 B1 | * | 1/2001 | Fike | 264/326 |
| 6,183,582 B1 | * | 2/2001 | Gregg | 156/138 |
| 6,390,406 B1 | * | 5/2002 | Wood | 242/443 |
| 2003/0041950 A1 | * | 3/2003 | Wellman et al. | 156/137 |

* cited by examiner

*Primary Examiner*—Gregory Vidovich
*Assistant Examiner*—Essama Omgba
(74) *Attorney, Agent, or Firm*—Brouse McDowell; Roger D. Emerson; Marcella R. Louke (57) ABSTRACT

A method for sequentially forming teeth in a belt that is supported on two cylinders. The method avoids having to measure the neutral plane radius by dividing the uncured belt into discrete molding sections and adjusting the length of each section prior to molding. The adjustment to the length is made so that the belt section is equivalent to a required length necessary to accommodate the proper fraction of total teeth. The first section to be molded is marked and aligned with the mold. Sequential belt sections are marked and aligned in similar fashion until teeth are molded along the entire circumference of the belt. The inventive method eliminates cumulative error by positioning each section of teeth relative to the underlying belt structure and not relative to the previous section which may have position errors within its own position tolerance.

12 Claims, 5 Drawing Sheets

CONTROL SYSTEM FOR ADJACENT PITCH IN PRESS CURED POSITIVE DRIVE BELTS

1. BACKGROUND OF THE INVENTION

A. Field of Invention

This invention pertains to a method and apparatus for the manufacture of a toothed power transmission belt, and more particularly to a means of determining the nominal position of each tooth in a molded belt prior to the process of molding the tooth.

B. Description of the Related Art

Synchronous power transmission belts transmit motion and power by the engagement of teeth on the belt to teeth on driving and driven sprockets. Commercial tolerances for some of these belts are given in RMA Engineering Standards IP-24 and IP-27. The tolerance of pitch length on such belts ranges from 4444 ppm for miniature belts of 91.44 mm pitch length to 291.5 ppm for large belts of 6860 mm pitch length. IP-27 specifies a pitch length tolerance of +−1.12 mm for a 200 tooth, 14 mm pitch belt, so the average tooth pitch tolerance is ±0.0056 mm. The pitch between adjacent teeth must be generally within ±0.0254 mm of the nominal pitch, and must be statistically distributed about the nominal value.

Some synchronous belts are made by applying layers of suitable belt materials to the circumference of a cylindrical mold. The mold is made with accurately spaced cavities on the internal or external circumference to form and vulcanize all of the teeth on the belt simultaneously. The spacing of teeth on the finished belt is largely dependent on the spacing accuracy of the mold cavities. The number of teeth in the belt must equal the number of cavities in the mold, so a different mold is required for each number of belt teeth and tooth spacing.

An alternative process uses a curved or flat mold with accurately spaced tooth forming cavities to mold and vulcanize an incremental portion of the belt teeth. The process is repeated in overlapping or abutting sections until all belt teeth are complete. Incremental molding with a flat mold is often called press cure. Incremental molding with a curved mold is often called roto-cure. Statistical variation of material properties, thermal expansion, and dimensional variation of uncured belt components often result in cumulative error of pitch and tooth position when a synchronous drive belt is cured incrementally. This cumulative error can result in excessive pitch error between molded sections, especially when a leading portion of the last section is cured to a trailing portion of the first section.

Press cured power transmission belts usually contain layers of fabric and elastomer that are formed into a flexible cylinder. A helical layer of one or more tensile members is also usually included. In a typical manufacturing process, the uncured and unmolded belts are supported on cylinders placed on either side of a planar mold. The cylinders, which may include grooves or ridges on their circumference, maintain alignment of the belts to the mold during the sequential molding of belt sections, and also apply tension to the cords of the belt to prevent their displacement in the molding process.

Roto-cured power transmission belts also contain layers of fabric and elastomer that are formed into a flexible cylinder. A helical layer of one or more tensile members is also usually included. In a typical manufacturing process, the uncured and unmolded belts are supported on cylinders, with at least one of the cylinders having tooth-forming cavities on the cylinder circumference. A concave outer mold is pressed against the outside of the belt to form the back side. The outer mold may itself be a flexible belt or band, which is wrapped around the supporting cylinder mold and belt. The cylinders maintain alignment of the belts during the sequential molding of belt sections, and also apply tension to the cords of the belt to prevent their displacement in the molding process.

The spacing of the teeth on the molded belt must be even all around the belt, even when the belt is shorter or longer than the nominal circumference. The exact pitch length circumference of the uncured belt is difficult to measure accurately because the radius of the belt neutral plane on the cylinders is difficult to determine.

The present invention provides methods and apparatuses for achieving uniform tooth spacing independent of the actual circumference of the belt.

II. SUMMARY OF THE INVENTION

The present invention is directed to a new and improved method of controlling the pitch of adjacent teeth in a synchronous power transmission belt. The improved method is particularly useful for cylindrical belts that are sequentially cured in sections in a planar press.

In accordance with the present invention, there is provided a method for manufacturing a toothed belt on a manufacturing machine, the manufacturing machine having a first cylinder, a second cylinder, and a planar mold, the toothed belt having an integral number of teeth and a design length at a certain tension. The inventive method comprises the steps of:

marking a first location on an uncured belt with a first mark;

determining a circumference of the uncured belt;

marking a second location on the uncured belt with a second mark to identify a first section of the uncured belt to be molded;

identifying sequential sections of the uncured belt to be molded;

marking a first location at a front effective edge of the mold with a first mold mark;

marking a second location at a rear effective edge of the mold with a second mold mark;

determining an actual length of the first section;

determining a working length of the mold;

calculating a first ratio of the actual length of the first section to the circumference of the uncured belt;

determining a number of teeth to be molded into the first section by multiplying the first ratio by a total number of teeth to be molded into the uncured belt;

calculating a second ratio of the number of teeth to be molded into the first section to a number of tooth-forming cavities in the mold;

calculating a required length of the first section by multiplying the working length of the mold by the second ratio;

adjusting a position of one of the cylinders to change the actual length of the first section to the required length of the first section;

positioning the uncured belt relative to the mold so that the first mark on the uncured belt is a first predetermined distance from the first mold mark and the second mark on the uncured belt is a second predetermined distance from the second mold mark;

applying the mold to the uncured belt to form teeth in the first section;

sequentially repositioning the uncured belt to mold the sequential belt sections.

One advantage of this invention is that cumulative error is eliminated by positioning each section of teeth relative to the underlying belt structure and not relative to the previous section of the belt that was just cured. The previous section of the belt that was just cured might have position errors within its own position tolerance and these errors, if allowed to accumulate, can make the belt tooth pitch exceed specification tolerances.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
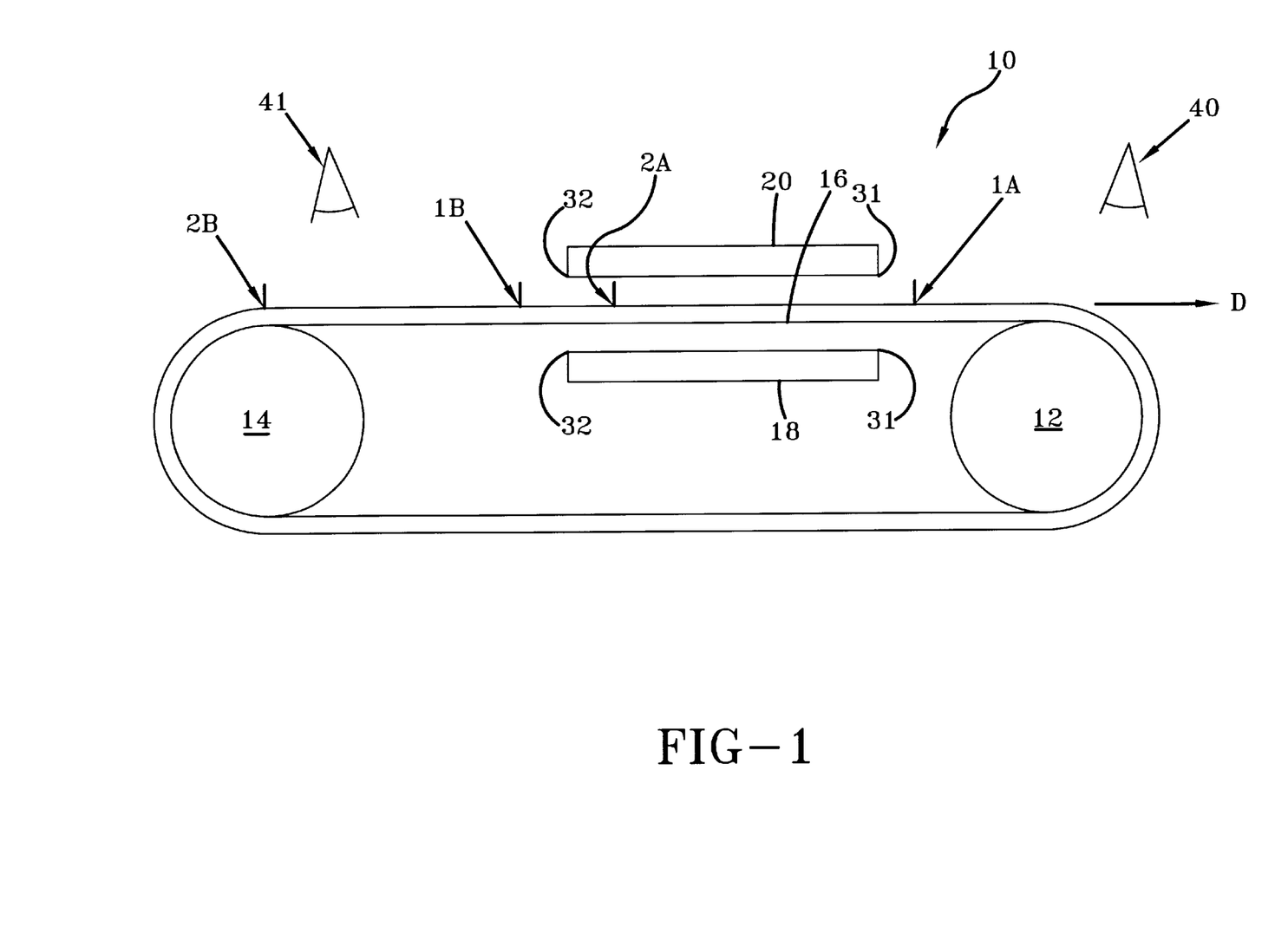
FIG. 1 is a schematic side view of a press cure manufacturing machine according to the present invention.

Referring now to the drawings wherein the showings are for purposes of illustrating a preferred embodiment of the invention only and not for purposes of limiting the same, FIG. 1 shows a schematic view of the innovative method and manufacturing machine according to the invention.

Figure 2:
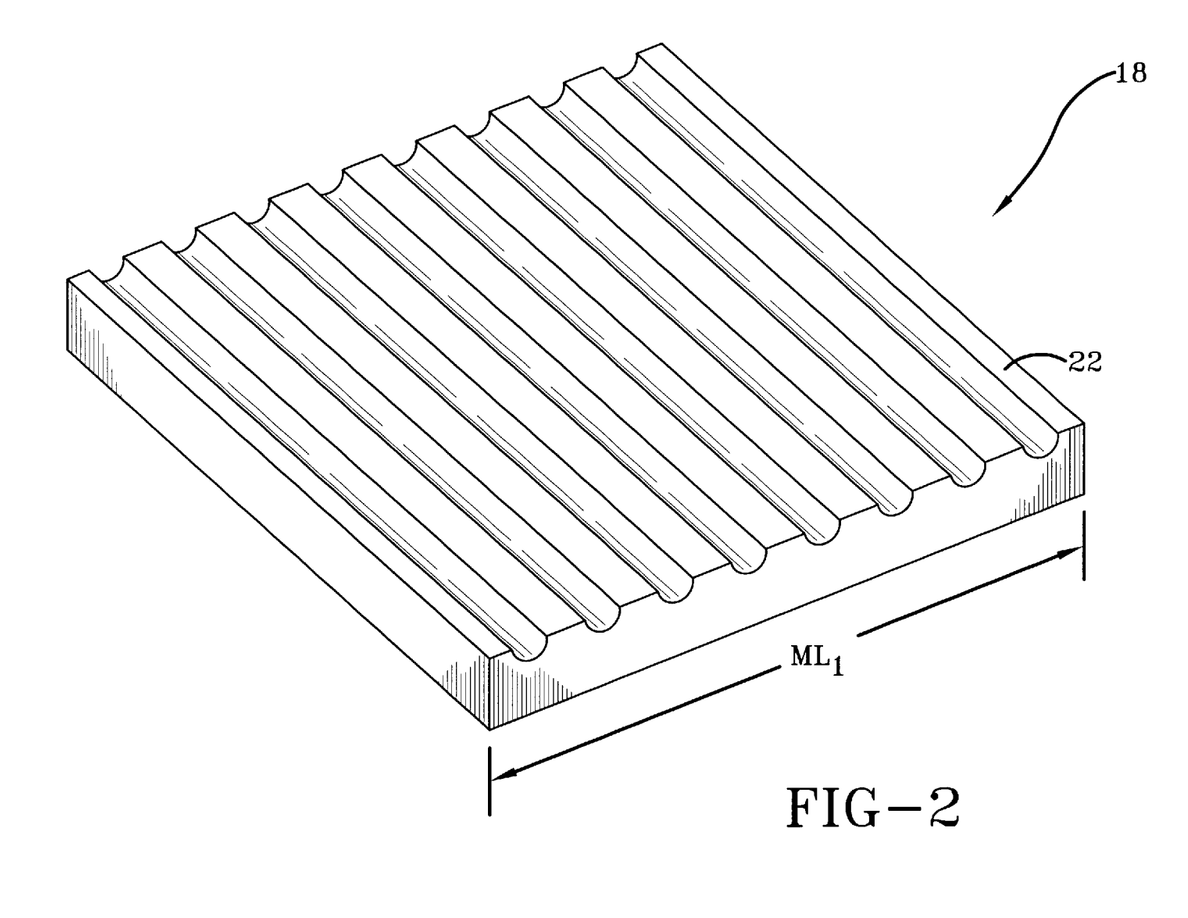
FIG. 2 is a view of the first mold half with straight tooth cavities.
Figure 5:
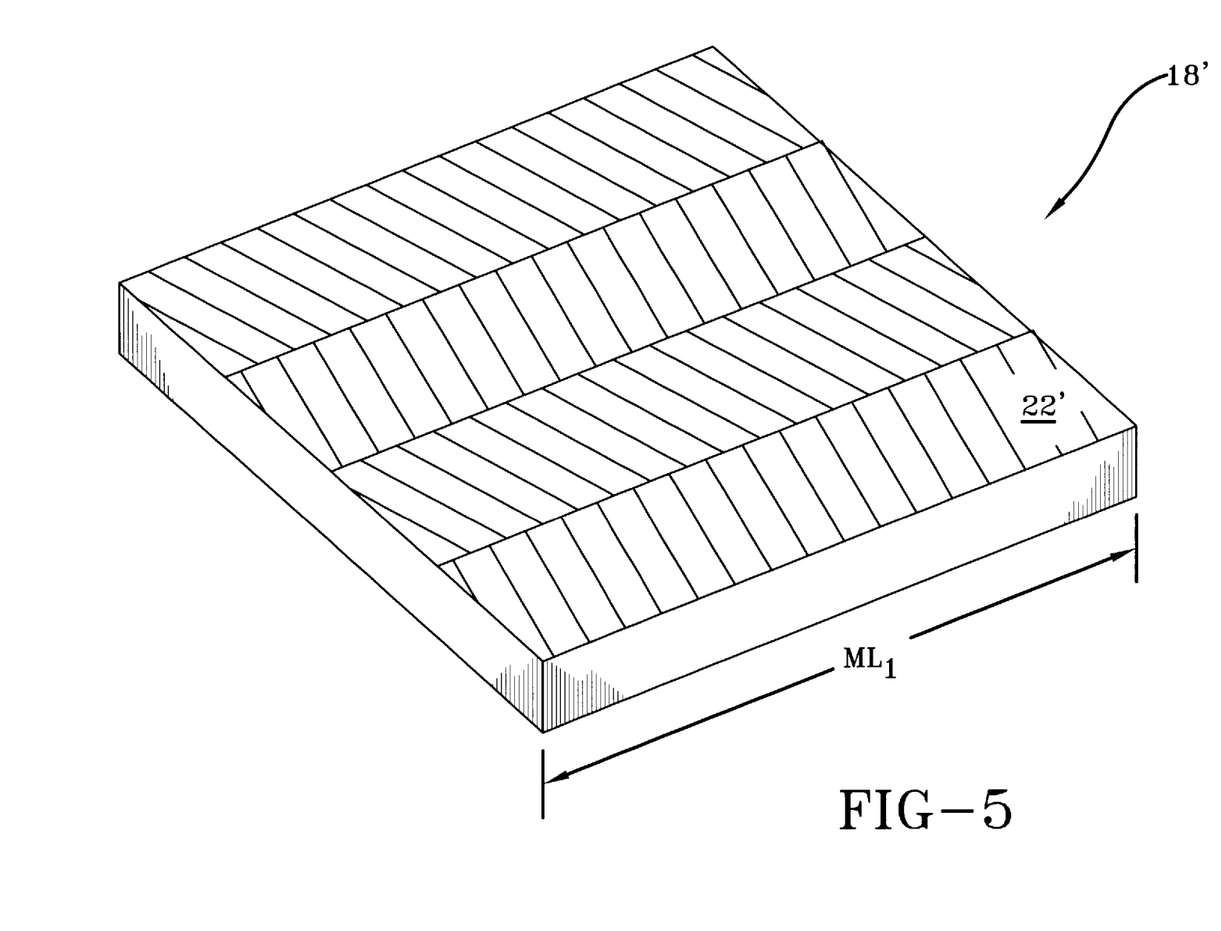

With reference to FIG. 2, a first mold half 18 is illustrated. With reference again to FIG. 1, both the first mold half 18 and the second mold half 20 are illustrated relative to the other portions of the inventive machine 10 and method. When the uncured belt 16 is pressed between the first and second mold halves 18, 20 teeth are formed into the belt 16. With reference to FIG. 2, an upper surface 22 of the first mold half 18 comprises a preferred design of straight ridges and valleys for forming teeth that are disposed perpendicular to the circumference of belt 16. Another preferred embodiment, shown in FIG. 5, utilizes a helical tooth pattern in the upper surface 22' of first mold half 18'.

In addition, with reference to FIG. 1, the belt 16 has a certain circumference. The circumference of the belt becomes the belt pitch length. When a belt 16 is designed for a specific application, a design length of the belt is determined. The design length is the ideal length that the belt 16 should be when cured. However, due to manufacturing inaccuracies, statistical variation of material properties and the like, real-world manufacturing situations require that deviations from the design length be tracked, identified, and accommodated for. Therefore, customers generally specify a certain length deviation from the design length that they are still willing to accept and can be used. Belts that fall outside of this range are unsuitable for use. However, even though differences in belt length may be acceptable, the number of teeth along the belt's length must not vary. In addition, the dynamic interaction of the belt to inertial loads during power transmission requires uniform spacing of the teeth regardless of average spacing or belt length. As such, one of the primary goals of this invention is to enable the belt manufacturer to spread length variation throughout the belt in such a way that the proper number of teeth is molded into the belt 16. The innovative process will now be described. The objective is to provide equal spacing of the belt teeth, even if the actual, average spacing is different than the nominal spacing.

The advantage of this method is that the relative errors in each belt section are identified and spread over the teeth in that section, rather than accumulating and adding throughout each of the belt sections. Formerly, all of the variation between design length and actual length of the belt 16 had to be accommodated for between the last belt section and first belt section. This is often impossible, leading to an incorrect number of teeth being formed or unacceptable spacing between teeth in the last belt section and first belt section. Under the innovative method described herein, small changes in length from the design length are accommodated for in each heat, thereby spreading the variations in acceptable increments over the entire length of the belt 16.

The inventive method eliminates cumulative error by positioning each section of teeth relative to the underlying belt structure and not relative to the previous section which may have position errors within its own position tolerance.

Figure 3:
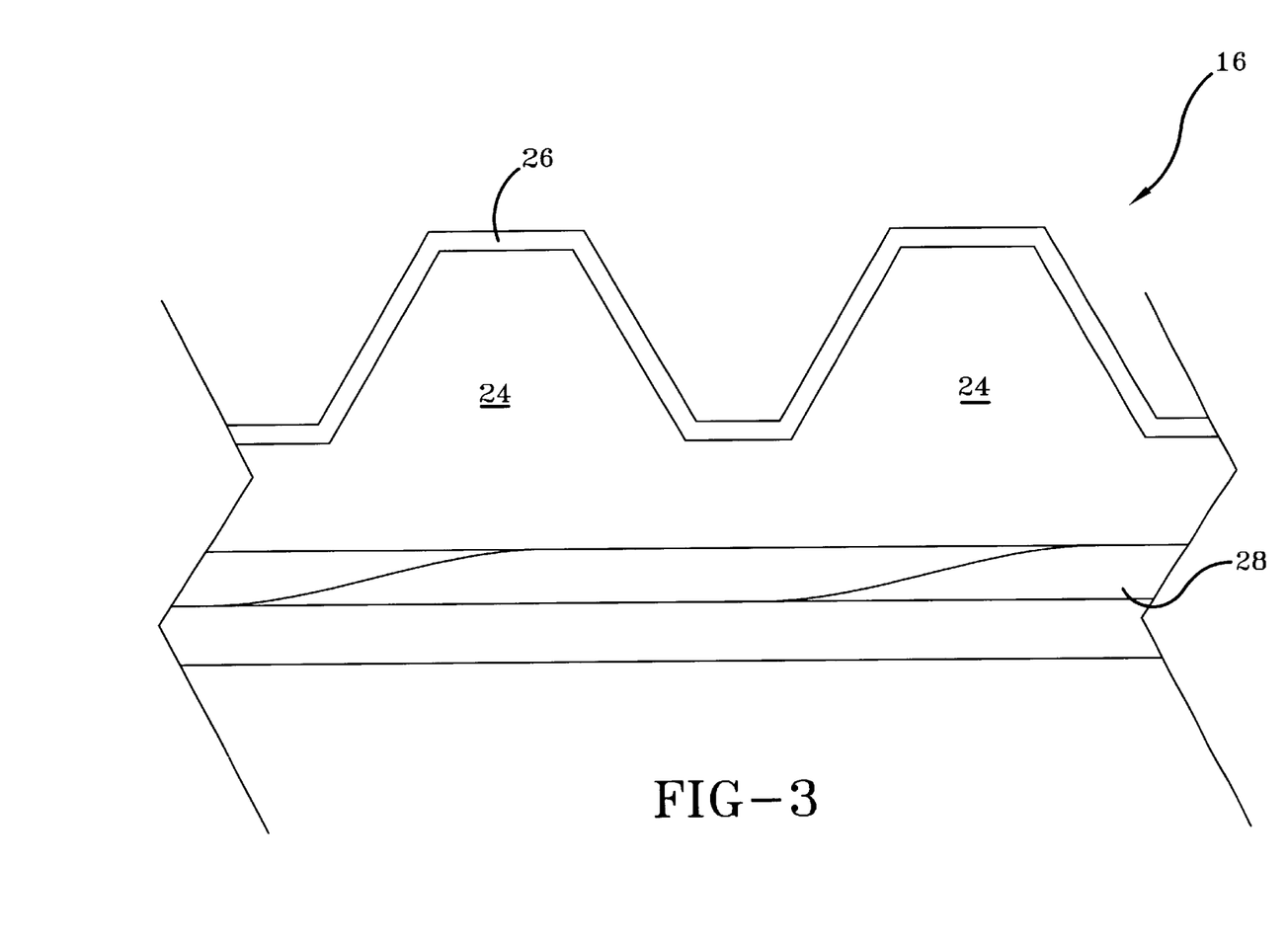
FIG. 3 is a cross-sectional representation of the teeth and the belt.

With reference to FIG. 3, a cross-sectional schematic representation of teeth 24 and the belt 16 is illustrated. In a currently preferred design, the teeth 24 hare covered with a facing fabric 26 and are supported by a tensile load-bearing member 28.

In the following description of the invention, different meanings are connoted by the term "length." The term "nominal length" refers to a design or theoretical length of the belt or a belt section. The term "actual length" refers to a measured length of the belt or belt section at a given temperature and tension. The term "required length" refers to the length of a belt section that will accommodate the proper number of molded teeth. The required length can be achieved by expanding or contracting the belt through adjusting the tension in the belt. Finally, the term "working length" refers to the length of a predetermined portion of the mold when it is heated to the working, or molding, temperature.

The inventive method disclosed herein utilizes a manufacturing machine comprising a first cylinder 12, a second cylinder 14 and a planar mold comprising first mold half 18 and second mold half 20. A belt 16 is supported on the first and second cylinders 12, 14 while teeth are molded into a belt surface. The belt 16 will have an integral number of teeth and a design length at a certain tension.

Various locations on the belt 16 will be discerned with the aid of a sensor 40 which may incorporate a vision system. In the preferred embodiment, a second sensor 41 is also utilized in the practice of the inventive method.

For exemplary purposes only, suppose it is desirable to mold a belt having a nominal length of 2800 mm with 200 teeth separated by a 14 mm pitch. However, the belt to be molded may have an actual length of 2799 mm. The present invention provides a method for forming the desired number of teeth into the belt wherein the deviation of the actual length from the nominal length is accounted for throughout the entire length of the belt 16 during the molding process.

Initially, a belt 16 is built that includes tooth-forming material to be molded into teeth. The belt 16 is installed on the rotating cylinders 12, 14. The cylinders 12, 14 are initially separated by a predetermined center-to-center distance.

In the practice of the inventive method, cure parameters such as the number of sequential heats; the index, or amount of belt advance per heat; the number of teeth to be molded into the belt ($NT_b$); the thermal expansion of the mold; the modulus of the belt; the molding temperature; and standard temperature must be determined and/or planned.

EXAMPLE

In this description of the invention, reference will be made to an ongoing example of the inventive method.

TABLE 1

| Cure Parameters and Initial Conditions | |
|---|---|
| Nominal Tooth Belt Pitch | 14 mm |
| Number Of Belt Teeth ($NT_b$) | 200 |
| Belt Nominal Length | 2800 mm |
| Number Of Mold Teeth ($NT_m$) | 28 |
| Number of Heat Cycles | 10 |
| Index Per Heat | 20 teeth |
| Standard Temperature | 68° F. |
| Mold Working Temperature | 400° F. |
| Mold Thermal Coefficient | $6.50 \times 10^{-6}$ in/in/° F. |
| Mold Length (Std. Temp.) | 392 mm |
| Mold Length (Working Temp.) | 392.846 mm |
| Belt Modulus | $3.00 \times 10^6$ N/mm/mm |
| Actual Belt Length | 2799 mm |
| Cylinder Land Circumference | 551.203 mm |
| Cylinder | 40 teeth |

(a) In the preferred method, a first location 1A is marked on the belt 16 and the belt 16 is loaded onto the cylinders 12, 14. The cylinders 12, 14 are rotated until first location 1A enters a vision field detectable by sensor 40. The initial position of location 1A is determined by sensor 40. The initial position of location 1A corresponds to a "zero" angular displacement of the cylinders 12, 14 as well as a "home position" on the belt 16.

(b) The cylinders 12, 14 are rotated in the direction indicated by arrow D until location 1A returns to home position as detected by sensor 40. The uncured pitch circumference of the belt 16 is determined in terms of angular displacement of the cylinders 12, 14. The uncured pitch circumference also may be measured in terms of rotation of the belt 16 itself. Each rotation of the belt 16 is equivalent to 360° of belt movement.

(c) In the next step, the belt 16 will be divided into a predetermined integral number of sections, with each section corresponding to a cure cycle. In the inventive method, at least one mark is made on the belt 16 in each of the divided sections of the belt 16. In the preferred embodiment, two or more marks are made on the belt 16 for each section to be molded. The marks are used for measurement and reference points. For the first section of the belt 16 to be molded, the first mark is at location 1A. A second mark is made on the belt 16 at a second location 1B.

(d) Cylinders 12, 14 are rotated to displace the belt 16 until sequential nominal positions of the belt 16 advance to the position originally occupied by mark 1A and marks are created on the belt as follows: 1B; 2A, 2B; 3A, 3B . . . nA, nB, where the nominal distance between 1A and 1B represents a nominal length of the belt to be molded with the first heat with offsets, the distance between 2A and 2B represents a nominal length to be molded with the second heat, and so on for "n" number of heat cycles.

In an ideal situation, location 1B would correspond exactly to location 2A. However, for practical considerations, the first molded belt length from 1A to 1B will slightly overlap the second molded section. Therefore the markings on the belt will pass the sensing location in this order: 1A, (nB), 2A, 1B, 3A, 2B, 4A, 3B . . . nA, n-1B.

EXAMPLE

For the present example, the belt 16 will include 200 total molded teeth to be formed in 10 heat cycles. Each section of the belt must be able to accommodate more than 20 teeth, if the sections are to overlap. The mold includes 28 tooth-forming cavities. In order for the marks 1A and 1B to be visible during the molding process, the distance between 1A and 1B should represent a length greater than what is needed for 28 teeth. A nominal number of teeth per heat cycle is chosen. In the present example, 30 teeth per belt section represents the desired number of teeth to be molded in the first section. In the present example, the belt circumference is measured in terms of angular displacement of the cylinders 12, 14 by rotating the cylinders 12, 14 until mark 1A returns to its original location as sensed by sensor 40. The exemplary rotation is approximately 1800° of the cylinders 12, 14, which is the nominal belt circumference. After location 1A has been marked and "zeroed" the belt is advanced a certain distance and marked as location 1B. The distance between location 1A and location 1B nominally relates to 420 mm in belt length (30 teeth times 14 mm pitch). The location of 1B may be determined in terms of angular displacement of the cylinders 12, 14. Each tooth represents $\frac{1}{200}^{th}$ of the total angular displacement, multiplied by 30 equals the angular rotation required for 30 teeth. In the present example, mark 1B would be placed at approximately 270° degrees of rotation of the cylinders 12, 14 away from mark 1A. (The distance from 1A to 1B may also be described in terms of belt displacement. One complete revolution of the belt is 360°. 30/200 times 360° equals 54° of belt displacement.)

(e) After each mark, 1A, 1B, 2A, 2B . . . nB is made on the belt 16 at nominal positions, the cylinders 12, 14 are then rotated so that the actual positions of the marks can be determined in terms of angular displacement of the cylinders.

EXAMPLE

The actual circumference of the belt 16 (location 1A to 1A) is determined to be 1799.3571°. The actual rotational positions of each of the marks are given in the following table:

TABLE 2

| Rotational Position of Each Mark (°) | |
|---|---|
| 1A | 0 |
| 1B | 269.904 |
| 2A | 179.936 |
| 2B | 449.839 |
| 3A | 359.871 |
| 3B | 629.775 |
| 4A | 539.807 |
| 4B | 809.711 |

TABLE 2-continued

Rotational Position of Each Mark (°)

| | |
|---|---|
| 5A | 719.743 |
| 5B | 989.646 |
| 6A | 899.679 |
| 6B | 1169.582 |
| 7A | 1079.614 |
| 7B | 1349.518 |
| 8A | 1259.550 |
| 8B | 1529.454 |
| 9A | 1439.486 |
| 9B | 1709.389 |
| 10A | 1619.421 |
| 10B | 1889.325 |

(f) A first ratio, $R_{1-1}$, is defined as the actual distance as an angle of the drum between 1A and 1B divided by the actual distance as an angle of the drum from 1A to 1A after a complete rotation of the belt 16. A first ratio is determined in like manner for each of the sections of the belt, $R_{1-2}$, $R_{1-3}$ ... $R_{1-n}$.

EXAMPLE

For example, the nominal distance from 1A to 1B in terms of cylinder rotation may be 270°. However, the actual rotation is determined to be 269.904° which is found by measurement by noting the angle of the drum when each mark is brought into the view of the measuring system 40. First ratio $R_{1-1}$ would be 269.904°/1799.3571° or 0.1500.

(g) The actual number of teeth ($NT_{H1}$) to be molded in the first section between 1A and 1B is determined by multiplying ratio $R_{1-1}$ by the total number of teeth in the mold.

EXAMPLE

In the present example, if 200 teeth are desired, then $R_{1-1}$ (0.1500) times 200 equals 30 teeth. In this example, $NT_{H1}$ turns out to be the integral number 30. However, under different conditions, this number may be a fractional number of teeth depending on how far the actual length of the belt circumference deviates from the nominal length and positioning error of the marks.

(h) Each section of the belt 16 to be molded must be properly positioned prior to molding. In a preferred method, two fixed points are used to align marks 1A and 1B. In FIG. 2, the fixed points are shown as points on the mold halves 18, 20 marked 31 and 32. A first point near a forward effective edge of each of the mold halves 18, 20 is marked with a first mold mark 31. A second location near a rear effective edge of the mold halves 18, 20 is marked with a second mold mark 32. The distance between the first mold mark at first location 31 and the second mold mark at second location 32 is defined as the working mold length, shown in FIG. 2 as $ML_1$, when the mold is at a working temperature.

EXAMPLE

In the example, nominally, the mold length would be 14 mm tooth pitch times 28 teeth equals 392 mm. However, at the working temperature, the working mold length is 392.84594 mm due to thermal expansion of the mold.

(i) A second ratio, $R_{2-1}$, for the first belt section to be molded between marks 1A and 1B is found by dividing the number of teeth required in the first section by the number of tooth-forming cavities in the mold. As the belt is sequentially molded, the second ratios are determined for each section, $R_{2-2}$, $R_{2-3}$ ... $R_{2-n}$.

EXAMPLE

Following the present example, $R_{2-1}$ equals $NT_{H1}$ divided by number of teeth in the mold (30/28=1.0714285).

(j) The required length of the first molded section from 1A to 1B of the belt 16 is calculated by multiplying the working length of the mold, $ML_1$ by the ratio $R_{2-n}$.

EXAMPLE

For example, 392.84594 mm times 1.0714285=420.906 mm, the required length of the first molded section.

(k) The belt 16 must be stretched or contracted in order for the actual length of the section from 1A to 1B to match the required length of the first molded section. In the preferred embodiment, one or both of the cylinders 12, 14 is moveable relative to the other to increase or decrease the center-to-center distance between them.

EXAMPLE

In the present example, the measured "actual length" of the first section from 1A to 1B is 419.850 mm; found by measuring with sensors 40, 41.

(l) The cylinders 12, 14 are then rotated so that the marks on the belt 16, 1A and 1B are centered relative to the marks 31 and 32 on the mold halves 18, 20. Sensor 40 is used to determined the distance from mark 1A on the belt 16 to mark 31 on the mold halves 18, 20. In the preferred embodiment, sensor 41 is used to determine the distance from mark 1B on the belt 16 to mark 32 on the mold halves 18, 20.

(m) The mold halves 18, 20 are closed and the first heat cycle is completed in order to form the first set of teeth and vulcanized the belt 16.

(n) After molding the first section, the cylinders are rotated so that marks 2A and 2B are centered relative to the marks 31 and 32 in order to mold the second belt section.

(o) Steps (m) and (n) are repeated until "n" number of heat cycles are completed.

An alternative method uses only one mark for each molded section after the first section, the mark near the front of the mold being replaced by the teeth of the previously molded belt section. The position of one or more of the previously molded teeth is used in the calculations above to determine rotation and position of the supporting cylinders.

An alternative method for the last section to be molded is to replace both marks with the measurements of the teeth in the first and previous molded sections. The distance between the teeth in the first section and the teeth in the previous (next-to-last) section are used in the calculations above.

Figure 4:
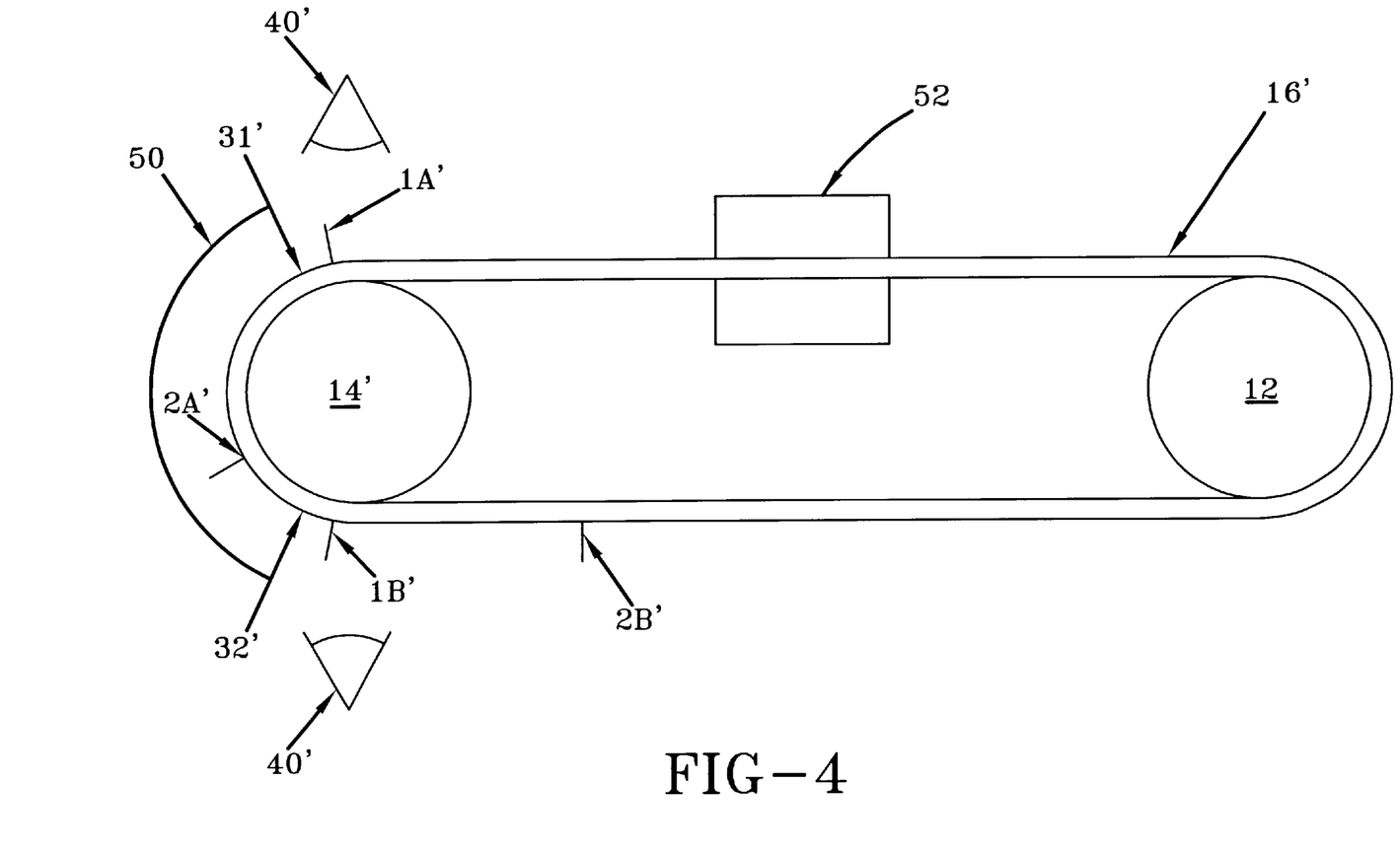
FIG. 4 is a schematic side view of a roto-cure manufacturing machine according to the present invention; and, FIG. 5 is a view similar to that of FIG. 2 wherein the first mold half includes a helical tooth pattern.

This invention is also applicable to roto-cured belt manufacturing as illustrated in FIG. 4. The measurable marks 1A' and 1B' are placed on the belt 16' at each molded section, in the same manner as the press cured manufacturing system. The marks 1A', 1B' can be applied in the curved part of the belt 16' which is wrapped around the cylinders 12, 14', or in the straight part of the belt between cylinders. The location of marks 1A' and 1B' are determined by sensors 40'. Marks 1A' and 1B' are placed at predetermined positions from marks 31' and 32' on the molding drum 50.

The preferred method of measuring this distance is as follows:

1. Place the belt in frictional contact with the support cylinders so that the belt circumference forms a path with two straight spans connected by a half circle at each support cylinder,
2. Note the position of the mark in a straight or curved span of the belt and the angular position of the supporting cylinder,
3. Rotate the cylinders so that the belt and mark move along the path described above until the mark returns to its original position.
4. Note the new position of the cylinders, and measure the angular distance moved by the cylinders. This total distance divided by the number of teeth in the belt is the required spacing of the teeth in terms of cylinder rotation angle.

The next step is to place additional marks on the belt, positioned relative to the first mark, and near the required position of the active portion of the molding cylinder so that 1 or 2 of the marks are measurable while a particular section of belt is being molded. The marks may be in the straight sections of the belt adjacent to the curved section being molded. The preferred method of locating the other marks is as follows:

1. Rotate the support cylinder through an angle which has the same proportion to the total angle measured above as the desired position of the mark has to the (unknown) total belt pitch circumference. The desired position of the mark is in the straight or curved span at the former location of the first mark.
2. Create the second mark, and measure its deviation, if any, from the desired position in the straight or curved span of the belt.
3. Repeat step 1 & 2 until 1 or more marks are created for each belt section to be incrementally molded.

The position of the tooth forming cavities on the molding cylinder are well known. The cylinder, like the mold which forms the belt teeth all at one time, can be made with precise outside diameter and angular spacing of the tooth forming cavities at a standard temperature.

Thermal expansion usually results in diameter change, but has little effect on angular position. The angular position of each cavity can be determined from the position of the drum itself. If the marks on the belt are to be in the straight spans adjacent to the mold, the outside radius of the mold must be measured or known. The belt contacts only a portion of the molding cylinder, so only a section of the cavities in the mold between a first (front) cavity and a second (back) cavity are forming the teeth in the belt.

The first section of teeth are molded into the proper portion of the belt as follows:

1. The support cylinders are rotated until the first mark on the belt is near the first (front) mold cavity and the second mark on the belt is near the second (back) mold cavity.
2. The angular distance between the first and second mark on the belt is measured. If the marks on the belt are in the straight spans adjacent to the molding cylinder, the working diameter of the cylinder is used to calculate the equivalent angle of the straight span of the belt between the mark and the point of tangency with the cylinder.
3. The number of teeth to be molded between the marks is calculated from the previously measured (drum rotation angle) distance between those marks, the total circumference (drum rotation angle) distance, and the total number of teeth in the belt.
4. The angular distance desired between the first and second marks during molding is calculated from the number of teeth to be molded between the marks; the number of cavities between the front and rear cavities in the working portion of the mold; and the angular distance between the front and rear cavities of the mold.
5. The support cylinders are moved closer together or farther apart to stretch or contract the belt circumference and the distance between the first and second mark on the belt to the desired distance.
6. The position of the marks on the belt is measured and compared to the position of the front and rear mold cavities. To center the marks on the mold cavities, the belt must be clamped to the other cylinder and the distance between cylinders adjusted to allow the belt to slip on the molding cylinder. The other cylinder is then rotated, without rotating the molding cylinder to move the belt and both belt marks until the nominal position in the belt is aligned with the nominal position in the mold. Alternatively, the belt can be fixed by a clamp in one or both straight spans. Either or both cylinders can be rotated to center the marks on the belt with the tooth forming cavities.
7. The outer mold is closed to form and vulcanize this section of the belt. The belt marks are frequently remeasured, desired length recalculated, and the support cylinders are moved to maintain the required position of the belt marks relative to the mold cavities.

The second and subsequent belt sections can be molded the same as the first section if each is provided with equivalent first and second marks. Alternatively, the mark for each section near the front of the mold can be replaced by the teeth of the previously molded belt section, and both marks can be replaced by teeth in the last section.

When the outer mold is in the form of a flexible band, the molding cylinder and band can be rotated continuously after closing the outer mold on the first section of the belt to be molded. The subsequent sections are gradually engaged with the working section of the molding cylinder while the first section is gradually disengaged with the working section.

The rate of rotation is slow enough to allow the accurate measurement of the cylinder position and the marks on the belt, to make the calculations, and adjust the other cylinder to maintain the proper belt position and length. The molded sections can be defined with a large overlap to allow more frequent measurements. For example, a mark can be placed on the unmolded belt for each tooth desired in the belt. The number of molded sections then equals the number of teeth in the belt. Each section is defined by the mark for a tooth near the front of the working section of the molding cylinder and a mark for a tooth near the rear of the working section of the molding cylinder.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for manufacturing a toothed belt on a manufacturing machine, the manufacturing machine having a first cylinder, a second cylinder, and a planar mold, the toothed belt having an integral number of teeth and a design length at a certain tension, the method comprising the steps of:

marking a first location on an uncured belt with a first mark;

determining a circumference of said uncured belt;

marking a second location on said uncured belt with a second mark to identify a first section of said uncured belt to be molded;

identifying sequential sections of said uncured belt to be molded;

marking a first location at a front effective edge of said mold with a first mold mark;

marking a second location at a rear effective edge of said mold with a second mold mark;

determining an actual length of said first section;

determining a working length of said mold;

calculating a first ratio of said actual length of said first section to said circumference of said uncured belt;

determining a number of teeth to be molded into said first section by multiplying said first ratio by a total number of teeth to be molded into said uncured belt;

calculating a second ratio of said number of teeth to be molded into said first section to a number of tooth-forming cavities in said mold;

calculating a required length of said first section by multiplying said working length of said mold by said second ratio;

adjusting a position of one of said cylinders to change said actual length of said first section to said required length of said first section;

positioning said uncured belt relative to said mold so that said first mark on said uncured belt is a first predetermined distance from said first mold mark and said second mark on said uncured belt is a second predetermined distance from said second mold mark;

applying said mold to said uncured belt to form teeth in said first section;

sequentially repositioning said uncured belt to mold said sequential belt sections.

2. A method for manufacturing a toothed belt on a manufacturing machine, the manufacturing machine having a first cylinder, a second cylinder, and a planar mold, the toothed belt having an integral number of teeth and a design length at a certain tension, the method comprising the steps of:

identifying a first section of an uncured belt to be molded;

determining a number of teeth to be molded into said first section;

determining a required length of said first section;

determining an actual length of said first section;

selectively manipulating said uncured belt until said actual length of said first section substantially matches said required length of said first section;

positioning said uncured belt relative to said mold; and applying said mold to said uncured belt to form teeth in said first section.

3. The method of claim 2 further comprising the step of:

identifying sequential sections of said uncured belt to be molded.

4. The method of claim 3 further comprising the step of:

sequentially repositioning said uncured belt to mold said sequential sections of said uncured belt.

5. The method of claim 3 wherein:

said step of identifying said first section of said uncured belt includes the steps of marking a first location on said uncured belt with a first mark and marking a second location on said uncured belt with a second mark; and, said step of identifying sequential sections of said uncured belt to be molded includes the step of marking one location on each of said sequential sections.

6. The method of claim 3 wherein said sequential sections include a last section and a next-to-last section and wherein said step of identifying sequential sections includes identifying said last section relative to teeth molded in said first section and said next-to-last section.

7. The method of claim 2 wherein said step of identifying said first section of said uncured belt further comprises the steps of:

marking a first location on said uncured belt with a first mark; and, marking a second location on said uncured belt with a second mark.

8. The method of claim 2 wherein said step of determining said number of teeth to be molded into said first section further comprises the steps of:

determining a circumference of said uncured belt;

calculating a first ratio of said actual length of said first section to said circumference of said uncured belt; and, multiplying said first ratio by a total number of teeth to be molded into said uncured belt to determine said number of teeth to be molded into said first section.

9. The method of claim 2 wherein said step of determining a required length of said first section further comprises the steps of:

determining a working length of said mold;

calculating a second ratio of said number of teeth to be molded into said first section to a number of tooth-forming cavities in said mold; and, multiplying said working length of said mold by said second ratio to determine said required length of said first section.

10. The method of claim 2 wherein said step of selectively manipulating said uncured belt further includes the steps of:

adjusting a position of one of said cylinders.

11. A method for manufacturing a toothed belt on a manufacturing machine, the manufacturing machine having a first cylinder, a second cylinder, and a molding drum, the toothed belt having an integral number of teeth and a design length at a certain tension, the method comprising the steps of:

identifying a first section of said an uncured belt to be molded;

determining a number of teeth to be molded into said first section;

determining a required length of said first section;

determining an actual length of said first section;

selectively manipulating said uncured belt until said actual length of said first section substantially matches said required length of said first section;

positioning said uncured belt relative to said molding drum; and applying said molding drum to said uncured belt to form teeth in said first section.

12. A method for manufacturing a toothed belt on a manufacturing machine, the manufacturing machine having a first cylinder, a second cylinder, and a molding drum, the toothed belt having an integral number of teeth and a design length at a certain tension, the method comprising the steps of:

marking a first location on an uncured belt with a first mark;

determining a circumference of said uncured belt;

marking a second location on said uncured belt with a second mark to identify a first section of said uncured belt to be molded;

identifying sequential sections of said uncured belt to be molded;

marking a first location of said molding drum with a first mold mark;

marking a second location of said molding drum with a second mold mark;

determining an actual length of said first section;

determining a working circumference of said molding drum;

calculating a first ratio of said actual length of said first section to said circumference of said uncured belt;

determining a number of teeth to be molded into said first section by multiplying said first ratio by a total number of teeth to be molded into said uncured belt;

calculating a second ratio of said number of teeth to be molded into said first section to a number of tooth-forming cavities in said molding drum;

calculating a required length of said first section by multiplying said working circumference of said molding drum by said second ratio;

adjusting a position of one of said cylinders to change said actual length of said first section to said required length of said first section;

positioning said uncured belt relative to said molding drum so that said first mark on said uncured belt is a first predetermined distance from said first mold mark and said second mark on said uncured belt is a second predetermined distance from said second mold mark;

applying said molding drum to said uncured belt to form teeth in said first section; and, sequentially repositioning said uncured belt to mold said sequential belt sections.

* * * * *